United States Patent [19]

Boll et al.

[11] Patent Number: 5,569,999
[45] Date of Patent: Oct. 29, 1996

[54] SYSTEM FOR MONITORING THE CURRENT DRAWN FROM TRACTION BATTERIES IN ELECTRIC VEHICLES AND HYBRID VEHICLES

[75] Inventors: Wolf Boll, Weinstadt; Günther Knörzer, Sachsenheim; Hans-Dieter Heidenfelder, Waiblingen, all of Germany

[73] Assignee: Mercedes-Benz AG, Germany

[21] Appl. No.: 384,265

[22] Filed: Feb. 6, 1995

[30] Foreign Application Priority Data

Feb. 4, 1994 [DE] Germany .......................... 44 03 468.7

[51] Int. Cl.$^6$ .................................. H02J 7/04; H02J 7/00
[52] U.S. Cl. .................................. 320/35; 320/13; 320/39; 320/31
[58] Field of Search ........................... 320/31–33, 39–40, 320/35–36, 29, 30, 47, 49, 54, 13, 15, 48; 180/65.2

[56] References Cited

U.S. PATENT DOCUMENTS

| | | | |
|---|---|---|---|
| 4,210,855 | 7/1980 | Harer et al. ................................. | 320/13 |
| 4,255,698 | 3/1981 | Simon ........................................ | 320/35 |
| 4,301,396 | 11/1981 | Bourke ...................................... | 318/490 |
| 4,313,080 | 1/1982 | Park . | |
| 4,394,741 | 7/1983 | Lowndes ................................. | 320/48 X |
| 4,558,281 | 12/1985 | Codd et al. ............................. | 320/48 X |
| 4,937,528 | 6/1990 | Palanisamy ............................. | 320/48 X |
| 5,164,653 | 11/1992 | Reem ....................................... | 320/13 |
| 5,264,764 | 11/1993 | Kuang ..................................... | 318/139 |
| 5,309,080 | 5/1994 | Odendahl et al. ..................... | 320/35 |
| 5,343,137 | 8/1994 | Kitaoka et al. ......................... | 320/13 |
| 5,374,886 | 12/1994 | Kohl et al. ............................. | 320/35 X |
| 5,394,089 | 2/1995 | Clegg ..................................... | 320/48 X |
| 5,502,365 | 3/1996 | Nanbu et al. ........................... | 318/798 |

FOREIGN PATENT DOCUMENTS

| | | |
|---|---|---|
| 24 00 396B2 | 7/1975 | Germany . |
| 30 37 195C2 | 4/1982 | Germany . |
| 33 17 834C2 | 11/1983 | Germany . |

OTHER PUBLICATIONS

British Search Report in corresponding foreign application.

*Primary Examiner*—Peter S. Wong
*Assistant Examiner*—K. Shin
*Attorney, Agent, or Firm*—Evenson, McKeown, Edwards & Lenahan P.L.L.C.

[57] ABSTRACT

The invention relates to a battery current monitoring system for traction batteries in electric vehicles and hybrid vehicles, in which battery current monitoring system the maximum battery current is monitored in order to avoid damage to the battery as a result of overheating due to excessively high battery currents and, if appropriate, the said maximum battery current is reduced to a normal value which is permitted for continuous operation. Monitoring is activated if the battery current exceeds a prescribed limit value. The battery current is however not reduced until the battery temperature exceeds a prescribed limit value. It is also proposed not to use the measured average battery temperature as the control variable, but rather to use a reference temperature calculated on the basis of heat balances for individual reaction zones of the battery. The monitoring is terminated as soon as both the average and the calculated battery temperatures drop below a prescribed uncritical value.

6 Claims, 3 Drawing Sheets

SYSTEM FOR MONITORING THE CURRENT DRAWN FROM TRACTION BATTERIES IN ELECTRIC VEHICLES AND HYBRID VEHICLES

BACKGROUND AND SUMMARY OF THE INVENTION

The invention relates to a system for monitoring current drawn from traction batteries in electric vehicles and hybrid vehicles.

German Patent Document DE-PS 33 17 834 discloses a control system for the traction motor of an electric vehicle with a traction battery, in which control system a set drawn current value (hereinafter referred to as "battery current") which is prescribed with the aid of an accelerator pedal is compared with two limit values and, if appropriate, limited in order to avoid overloading. The first limit value depends on the pulse duty factor of the power circuit breaker and, if appropriate, also on further operating parameters, for example, the temperature of the power circuit breaker, while the second limit value continuously decreases from a maximum value to a minimum value for the duration of the current limiting.

The disadvantage of this control system lies in the fact that, although the overload protection is activated as a function of the battery current, and not as a function of the temperature, damage to the battery is not caused by an excessively high battery current, but rather by the high temperatures which occur during this process. Under certain conditions, therefore, the battery current can be prematurely reduced; that is, even when dangerously high temperatures have not yet been reached. Taking into account a temperature-dependent factor during the calculation of the limit value cannot prevent this either.

The object of the invention is to provide a battery current monitoring system such that the short term availability of high battery currents is improved, while simultaneously ensuring an effective overload protection.

This object is achieved according to the invention by exploiting the fact that damage to the battery is not caused by a high battery current, but rather by the temperature rise associated therewith. Therefore, it is proposed not to start the battery current reduction until a critical battery temperature has been reached. As a result, the battery current is not reduced until the battery is actually at risk. The monitoring process itself continues to be started when a critical battery current is reached.

Since in a battery there is always a difference between the temperature prevailing inside the battery and the temperature which can be measured at its surface, it is proposed according to a further embodiment of the invention not to use the average measured temperature as the upper limit value but rather a battery temperature which is theoretically calculated on this basis.

Other objects, advantages and novel features of the present invention will become apparent from the following detailed description of the invention when considered in conjunction with the accompanying drawings.

DETAILED DESCRIPTION OF THE DRAWINGS

Figure 1:
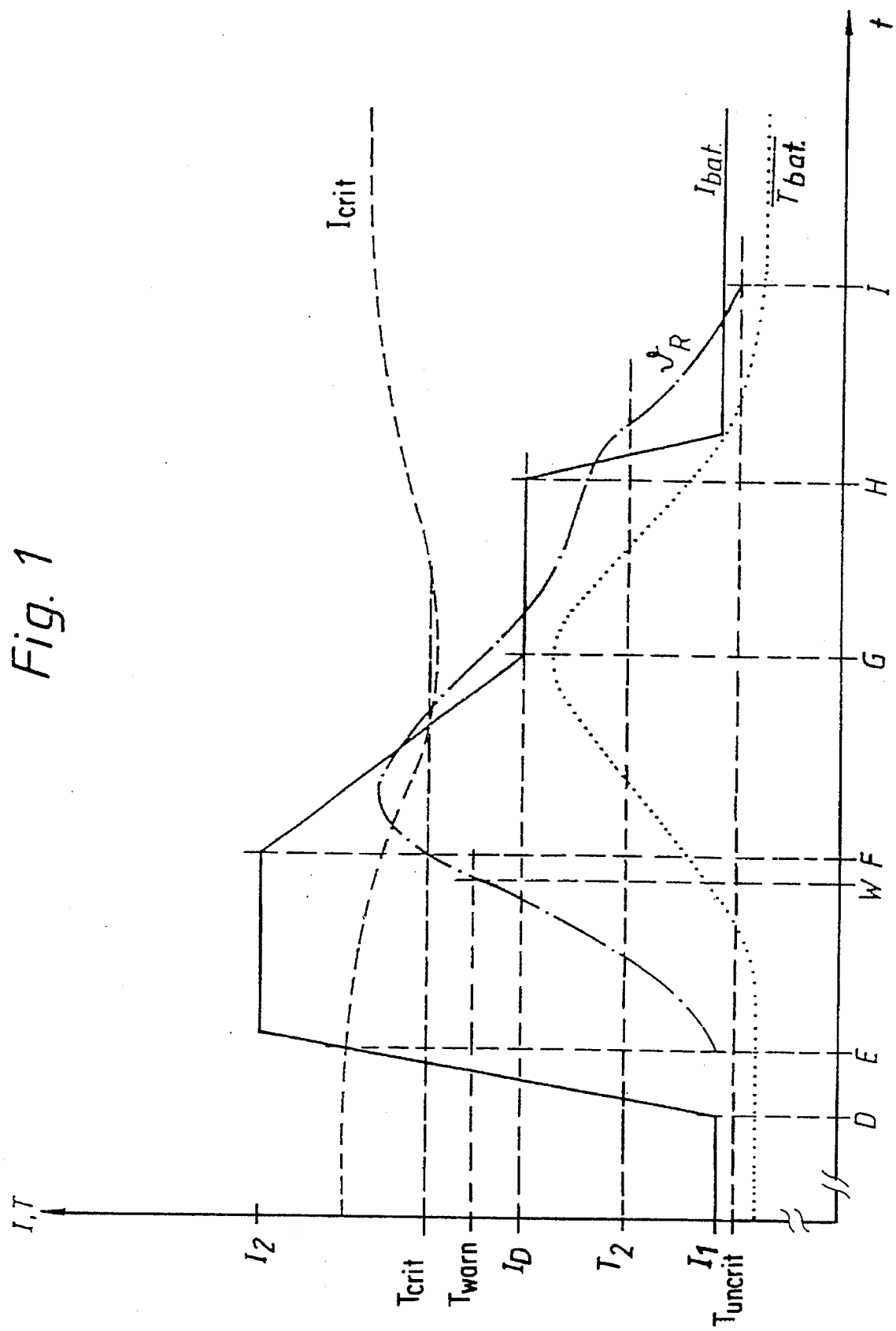
FIG. 1 is a diagram which illustrates the basic progression of the values for the battery current, the current limiting value, the average battery temperature and the calculated battery temperature while the vehicle is travelling on a route with a positive incline.

The diagram illustrated in FIG. 1 shows the basic progression of the most important operating parameters of a traction battery while a vehicle driven with the aid of an electric motor is travelling on a route with a positive incline. The curve for the battery current $I_{bat}$ is shown by a continuous line while the average battery temperature $\overline{T}_{bat}$ is represented by a dotted line, a calculated battery temperature $\partial_R$ is a dot-dash line and the critical battery current $I_{crit}$ is a dashed line.

Up to point D on the time axis, the vehicle travels at a constant speed on a flat route so that the battery current $I_{bat}$ assumes a constant value I1. At the point D at which the route with a positive incline begins, the driver depresses the accelerator pedal further in order to maintain the speed of the vehicle and thus requests a higher battery current from the traction battery. Assuming a route with a constant positive incline, the battery current $I_{bat}$ therefore increases relatively quickly from the value $I_1$ to a higher, but also constant value $I_2$. At the point E, the battery current $I_{bat}$ reaches a prescribed limit value $I_{crit}$. As a result, the battery current monitoring system according to the invention is activated. Starting from an average battery temperature $\overline{T}_{bat}$ which is measured with the aid of a sensor, a calculated battery temperature $\partial_R$ is now determined, in a manner explained below.

This calculated battery temperature $\partial_R$ is continuously compared with a prescribed limit value $T_{crit}$. As a result of the constant, but high battery current $I_2$ the battery heats up until at point W it reaches the temperature $T_{warn}$, at which a visual and/or audible warning signal to the driver commences. The warning signal is intended, inter alia, to inform the driver that he must soon expect a reduction in power. Subsequently, at point F, the prescribed limit value $T_{crit}$ is reached. In order to prevent the battery from being damaged by a further increase in temperature $\partial_R$, starting from this time the battery current $I_{bat}$ is gently reduced from the instantaneous high battery current $I_2$ to a value $I_D$ which corresponds to a battery current which is undamaging even for continuous operation. The value $I_D$ is reached at point G and maintained until the request for the battery current assumes a value $I_{bat} < I_D$. In the example shown, it is assumed that at point H the vehicle has reached the end of the positive incline and therefore the driver again requests a smaller battery $I_1$ via the accelerator pedal. The battery current monitoring system is, however, not deactivated again until the measured average battery temperature $\overline{T}_{bat}$ and the calculated battery temperature $\partial_I$ assume an uncritical value $T_{uncrit}$. This time is reached at point I in the diagram shown.

The diagram also contains the progression for the critical battery current $I_{crit}$ which is inversely proportionally to the measured average battery temperature $\overline{T}_{bat}$. This allows for the fact that the battery is at greater risk from overheating at an increased operating temperature and therefore the monitoring of the battery current $I_{bat}$ must start correspondingly earlier. The battery current monitoring system is activated when the battery current $I_{bat}$ reaches the critical value $I_{crit}$, that is to say at the point E where the curves for the battery current $I_{bat}$ and the critical battery current $I_{crit}$ intersect.

The calculated battery temperature $\partial_R$ is calculated from the battery current $I_{bat}$, the internal resistance $R_i$ and from the characteristic heat capacity c of the battery starting from the very slowly reacting average battery temperature $\overline{T}_{bat}$ which is continuously measured with the aid of a temperature sensor. The internal resistance for this purpose can either be determined directly or taken from a characteristic diagram. The characteristic heat capacity c relates to the relatively small masses of the chemical reaction zones which are damaged when overheating occurs. The calculated battery temperature $\partial_R$ is continuously calculated by heat balances in which both the transmission of heat to the surroundings and also the drifting of the average battery temperature $\overline{T}_{bat}$ can be taken into account. Since, instead of the large overall mass of the battery, only the relatively small mass of a chemical reaction zone is entered in the calculation, when the current is drawn the calculated battery temperature $\partial_R$ rises faster than the average battery temperature $\overline{T}_{bat}$. The theoretical value of the calculation of $\partial_R$, therefore, simulates the increased temperatures prevailing inside the battery.

Figure 2A:
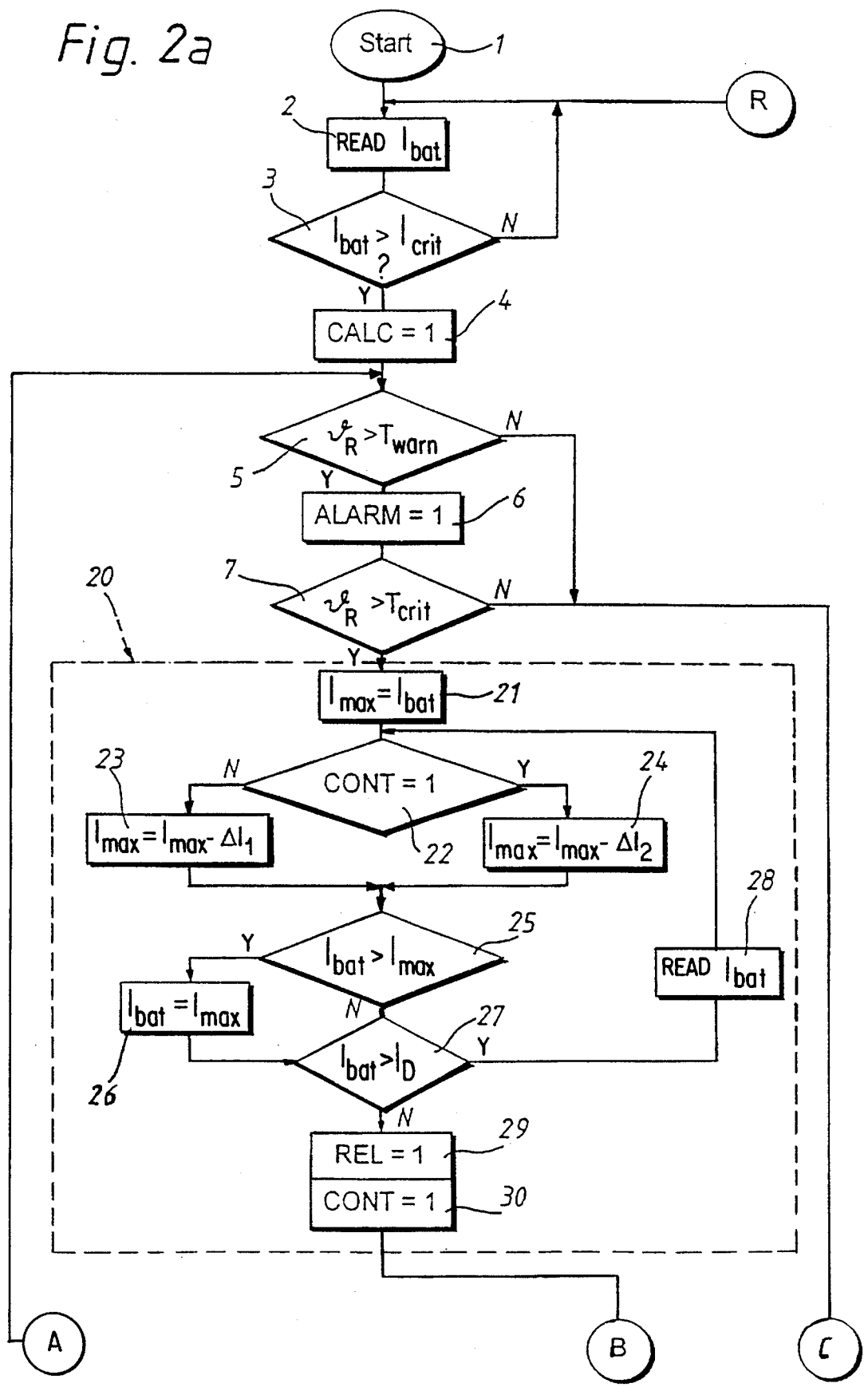
FIGS. 2a and 2b show a flow diagram of a battery current monitoring system according to the invention.
Figure 2B:
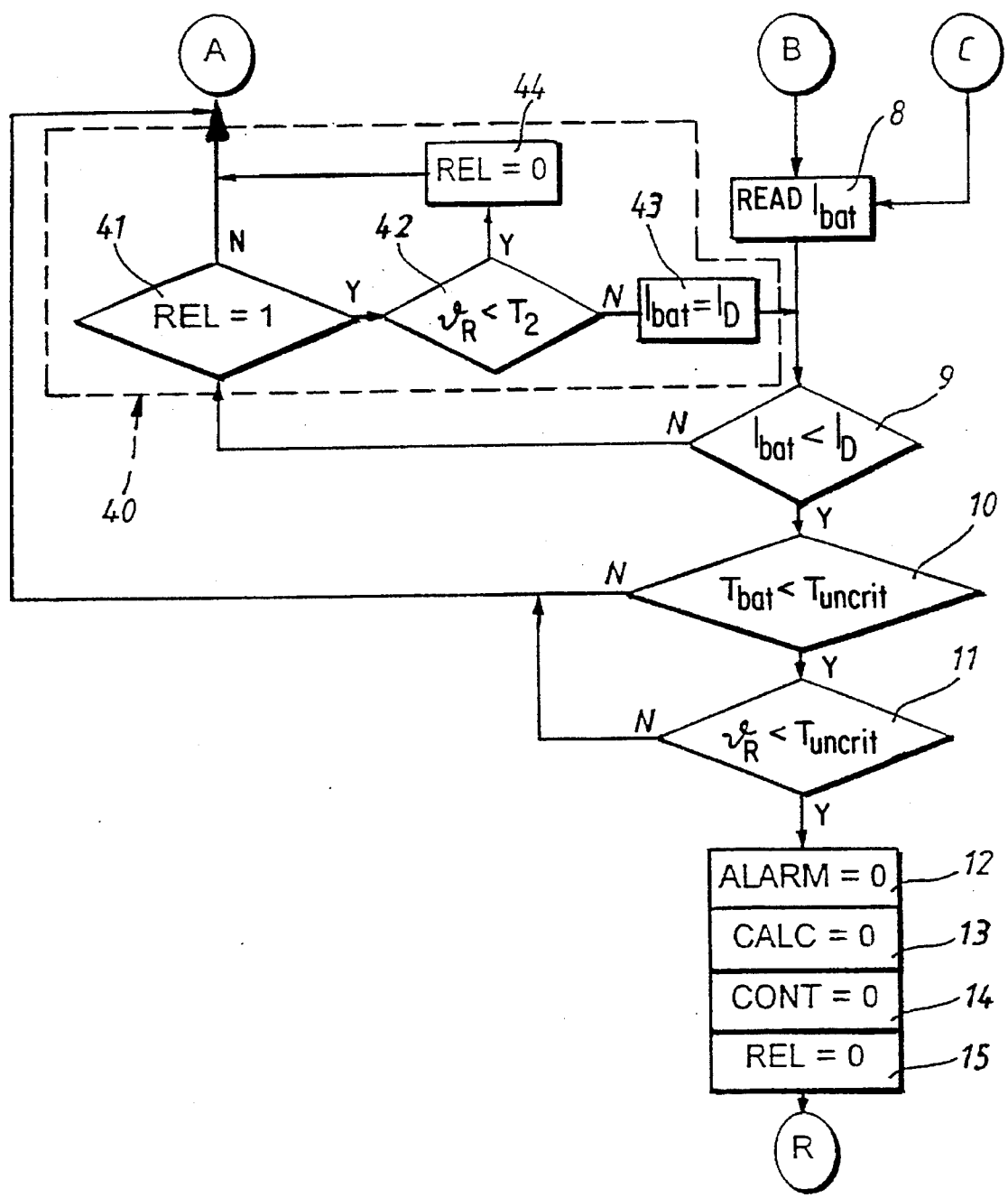

Below, the battery current monitoring system according to the invention is explained in greater detail with reference to the example of the flow chart illustrated in FIG. 2. After the start of the electric vehicle, in block 2 the value for the battery current $I_{bat}$ is read in. If the electric motor is operated with the aid of a power controller, in each case the battery current $I_{bat}$ requested instantaneously by the driver by means of the position of the accelerator pedal is provided as new input variable for the battery current monitoring system during the reading in of the battery current $I_{bat}$. However, the value which has been previously read in in the previous read-in step and intermediately updated for the battery current $I_{bat}$ is transmitted to the motor control as an instantaneous value.

In block 3, it is subsequently tested whether the battery current $I_{bat}$ exceeds a prescribed limit value $I_{crit}$. In order to allow for the fact that, at an increased operating temperature $\overline{T}_{bat}$ of the battery, a critical battery temperature $T_{crit}$ is reached more quickly as a result of a request for a high battery current $I_{bat}$ than in the case of a lower operating temperature $\overline{T}_{bat}$, the battery current limit value $I_{crit}$ can be reduced with increasing average battery temperature $\overline{T}_{bat}$. As long as the battery current $I_{bat}$ remains below the limit value $I_{crit}$, the beginning of the block 2 is branched back to and a new value for the battery current $I_{bat}$ is read in. Block 4 is not entered until the battery current $I_{bat}$ exceeds the limit value $I_{crit}$. The value 1 is then assigned to the variable CALC at the said block 4, and as a result the battery current monitoring system is activated, including starting the calculation process for the calculated battery temperature $\partial_R$.

Blocks 5 and 6 comprise a warning system by which it is to be indicated to the driver that a reduction in the battery current $I_{bat}$ and thus a restriction of the motor power are imminent. The purpose of this is to prevent the driver from being surprised in critical situations, for example, during a passing maneuver by reduction of battery current. For this purpose, in block 5, the calculated battery temperature $\partial_R$ is compared with a value $T_{warn}$ which is just below the critical temperature $T_{crit}$. If the calculated temperature $\partial_R$ lies below the temperature $T_{warn}$, the process proceeds to block 8, where a new value for the battery current $I_{bat}$ is read in. If, in contrast, in block 5 the calculated temperature $\partial_R$ exceeds the prescribed temperature $T_{warn}$, in block 6 the value 1 is assigned to the variable ALARM and as a result a visual and/or audible warning signal for the driver is activated.

Subsequently, in block 7 it is tested whether the calculated temperature $\partial_R$ exceeds a prescribed temperature $T_{crit}$. The critical temperature $T_{crit}$ is set to a value at which damage to the battery can still be excluded. If the critical temperature $T_{crit}$ has not yet been reached, processing proceeds to block 8, where a new value for the battery current $I_{bat}$ is read in. If, in contrast, in block 7 the calculated temperature $\partial_R$ exceeds the critical temperature $T_{crit}$, branching proceeds to the reduction in battery current designated in its entirety by 20 and described in greater detail below.

After a new value for the battery current $I_{bat}$ is read in in block 8, subsequently in blocks 9 to 11 the conditions for termination of the battery current monitoring system are tested. This testing takes place independently of whether the battery current $I_{bat}$ has previously been reduced or not. First, in block 9 the new value $I_{bat}$ is compared with the constant battery current $I_D$. If it is detected here that the value for $I_{bat}$ exceeds the value $I_D$, the section which is designated in its entirety by 40 is entered, it being tested in the said section whether a battery current reduction has already taken place hitherto or whether the calculated battery temperature $\partial_R$ has recovered since the last peak load. Otherwise, that is to say, when the battery current $I_{bat}$ is smaller than the value $I_D$, it is tested in block 10 and 11 whether the average battery temperature $\overline{T}_{bat}$ and the calculated temperature $\partial_R$ have dropped below an uncritical value $T_{uncrit}$. If one of the two values $\overline{T}_{bat}$, $\partial_R$ is greater than $T_{uncrit}$, branching back to the beginning of block 5 takes place. Only if the value for the battery current $I_{bat}$ lies below the value $I_D$ and the values for both the average battery temperature $\overline{T}_{bat}$ and the calculated temperature $\partial_R$ lie below the uncritical temperature $T_{uncrit}$, is battery current monitoring terminated after resetting of the variables ALARM, CALC, CONT and REL to the start value zero in blocks 12 to 15. Subsequently, the process jumps back to block 2, where a new value for the battery current $I_{bat}$ is read in and subsequently compared with the limit value $I_{crit}$.

The actual battery current reduction process is contained in section 20. The battery current reduction is commenced if in block 7 the calculated temperature $\partial_R$ exceeds the critical value $I_{crit}$. If so, in block 21 the instantaneous value for the battery current $I_{bat}$ is assigned to the maximum acceptable battery current $I_{max}$. Subsequently, the maximum acceptable battery current $I_{max}$ is reduced by a specific value $\Delta I$ as a function of the value of the variable CONT. (The variable CONT indicates here whether a battery current reduction has already previously been carried out.) If, in block 22, CONT is not equal to 1, branching to block 23 takes place where the value for the maximum acceptable battery current $I_{max}$ is reduced by a first prescribed value $\Delta I_1$. If, in contrast, in block 22 the variable CONT= 1, that is to say a battery current control has already taken place, in block 24 the value for the maximum acceptable battery current $I_{max}$ is reduced by a second value $\Delta I_2$. Since in this case a high battery current $I_{bat}$ has already previously been requested, the risk of damage to the battery by overheating is greater. Therefore, the decrement $\Delta I_2$ is selected to be greater than the value for $\Delta I_1$ so that the battery current $I_{bat}$ is reduced more quickly.

In block 25, it is subsequently tested whether the battery current $I_{bat}$ exceeds the maximum acceptable battery current $I_{max}$. In the first pass, this is certainly the case so that branching to block 26 takes place where the maximum acceptable value $I_{max}$ is assigned to the instantaneous value for the battery current $I_{bat}$ before, subsequently, in block 27 the instantaneous battery current $I_{bat}$ is compared with a prescribed value $I_D$. If in block 25 the battery current $I_{bat}$ is smaller than the maximum acceptable value $I_{max}$, block 27 is jumped to directly. The prescribed value $I_D$ corresponds to a battery current which can be drawn in continuous operation without damaging the battery. As long as in block 27 the battery current $I_{bat}$ exceeds the constant battery current $I_D$, block 28 is jumped to where a new value for the battery current $I_{bat}$ is read in. Subsequently, the beginning of block 22 is entered and in the next pass the maximum acceptable battery current $I_{max}$ is reduced further. The battery current reduction 20 is not departed from again until the battery current $I_{bat}$ has been reduced either by the battery current reduction or by the driver itself to a value which is smaller than the constant battery current $I_D$.

In this case, branching then occurs from block 27 to blocks 29 and 30 where the variables REL and CONT are assigned the value 1. The variable CONT indicates, as already described above, whether the battery current reduction has already previously been carried out. The variable REL indicates whether a certain relaxation time has passed since the last battery current reduction. This is important since the battery has to cool down between two peak loads, so-called overboost phases, in order to be able to reliably prevent damage as a result of overheating. The testing of the relaxation of the battery takes place in the section designed in its entirety by 40. For this purpose, in block 41 the value of the variable REL is tested. If it is detected here that REL= 0 (that is to say has a value not equal to 1), the beginning of block 5 is jumped to. This is the case if no battery current reduction has taken place since the start of the battery current monitoring or if the battery has already sufficiently cooled down since the last battery current reduction. If, in contrast, the value 1 has been assigned to the variable REL in block 30 during the passing through of the battery current reduction, in block 41 branching takes place to block 42 where the calculated temperature $\partial_R$ is computed with a prescribed temperature $T_2$. The temperature $T_2$ is selected such that, in the case of another peak load, overheating of the battery can be excluded.

If, in block 42, the calculated temperature $\partial_R$ has not yet dropped below the temperature $T_2$, block 43 is branched to where the battery current $I_{bat}$ is limited to the value $I_D$. A new overboost operation is thus not permitted at this time. Subsequently, the beginning of block 8 is jumped to where a new value for battery current $I_{bat}$ is read in. If in contrast, the calculated temperature $\partial_R$ in block 42 has already dropped below the temperature $T_2$, block 44 is branched to where the value 0 is assigned to the variable REL. Subsequently, the beginning of block 5 is jumped to where, if appropriate, renewed battery current reduction can be initiated.

For the progression shown in FIG. 1, the following sequence of the method according to the invention results: after starting of the vehicle the calculation of the battery temperature $\partial_R$ is not activated since all the variables have the value 0. Since, at the beginning, the battery current $I_{bat}$ has not exceeded the critical value $I_{crit}$, the system continuously jumps back from block 3 to the beginning of block 2 and a new value for the battery current $I_{bat}$ is read in. The battery current $I_{bat}$ does not reach the critical value $I_{crit}$ until the point E so that in the next pass branching takes place from block 3 to block 4 where the variable CALC is assigned the value 1 and as a result the determination of the calculated temperature $\partial_R$ is started. In block 5, the calculated temperature $\partial_R$ is then compared with the value $T_{warn}$. This value $T_{warn}$ is not reached up to point W, so that in each case the system jumps from block 5 to block 8 and a new value for battery current $I_{bat}$ is read in there. Since, in block 9 the battery current $I_{bat}$ continues to exceed the value $I_D$, branching takes place from there to block 41. Since here the variable REL has the value of 0, the system jumps from here back to the beginning of block 5 and the loop is run through again from there.

Between points W and F, the loop described above continues to be run through with the distinction that now branching takes place from block 5 to block 6 and 7 and it is only there that the system jumps to block 8. Since, in block 6 the variable ALARM has the value 1 assigned to it, a warning signal is output to the driver starting from the point W. Starting from point F, the calculated temperature $\partial_R$ now reaches the critical value $T_{crit}$ so that in block 7 branching takes place to block 21 where the instantaneous value of the battery current $I_{bat}$ is assigned to the maximum permitted battery current $I_{max}$. Since the variable CONT has the value 0, branching subsequently takes place from block 22 to block 23 and there the maximum permitted battery current $I_{max}$ is decremented by a value $\Delta I_1$. Since subsequently in block 25 the instantaneous battery current $I_{bat}$ is greater than the maximum value $I_{max}$ now decremented, branching takes place to block 26 where the battery current $I_{bat}$ is reduced to maximum permitted battery current $I_{max}$. In block 27 it is then tested whether the battery current $I_{bat}$ is still exceeding the prescribed constant battery current. Since this is the case up to point G, at this location branching to block 28 takes place up to the time G and, after a new value for the battery current $I_{bat}$ has been read in, the beginning of block 22 is jumped back from there. In the event the driver has already reduced the requested battery current $I_{bat}$ to a value below $I_D$ already before the constant battery current $I_D$ is reached at the point G, the system would jump directly from block 25 to block 27 without setting the instantaneous battery current $I_{bat}$ to the value of $I_{max}$. Here, the system then leaves the loop and sets the variables REL and CONT to the values 1 before the battery current reduction is terminated.

Subsequently, in block 8 a new value for the battery current $I_{bat}$ is in turn read in. Between the points G and H where the driver continues to request a battery current $I_{bat}$ which is greater than the constant battery current $I_D$, in block 9 branching takes place to block 41. Since the battery current control 40 has already been run through, the variables REL and CONT have the value 1 so that in block 41 branching to block 42 takes place. Since the calculated temperature $\partial_R$ is still larger here than the value $T_2$, branching to block 43 takes place where the battery current $I_{bat}$ is limited to the value $I_D$ and subsequently the beginning of block 8 is jumped to. At the point H, the battery current $I_{bat}$ requested by the driver drops to a value below $I_D$ so that in block 9 the system does not jump to block 41 but rather to block 10. From here, the beginning of block 5 is jumped back to until the average battery temperature $I_{bat}$ reaches the uncritical value $\overline{T}_{uncrit}$. Starting from this time, the system jumps from block 10 to block 11. Here the beginning of block 5 is likewise branched back to until the calculated temperature $\partial_R$ at the point I also drops below the uncritical value $T_{uncrit}$. Only then are the variables ALARM, CALC, CONT and REL in the blocks 12 to 15 reset and the battery current monitoring subsequently terminated.

If a battery current $I_{bat}$ which is greater than the constant battery current $I_d$ is requested again starting from the time at which the calculated temperature $\partial_R$ drops below the value $T_2$, the system jumps from block 42 to block 44 where the variable REL is set to the value 1. This means that the battery has recovered and that therefore high battery current $I_{bat}$ are permitted again until then in block 7, after a renewed increase in the battery temperature to the value greater than $T_{crit}$, the battery current reduction is started again.

In addition to the battery current reduction described above, it is also possible to prescribe for the battery current $I_{bat}$ a fixed maximum value, for example, 30% above constant battery current $I_D$, which must not be exceeded under any circumstances. However, it is also possible to permit a higher maximum current, for example, 100% above the constant battery current $I_D$. Here, the critical temperature $T_{crit}$ is then selected to be relatively low so that the reduction of the battery current $I_{bat}$ already begins when the increase in the temperature $\partial_R$ is small.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for monitoring a battery current drawn from a traction battery in an electric or hybrid vehicle, comprising the steps of:

comparing said battery current with a battery current limit value which is a function of battery temperature of said battery;

initiating said monitoring when said battery current exceeds said limit value;

comparing the battery temperature with a predetermined temperature limit value; and whenever the battery temperature exceeds the predetermined temperature limit value, reducing the battery current to a predetermined normal value.

2. Method according to claim 1, wherein internal heating of a small chemical reaction zone of said battery is calculated, based on battery current, internal resistance and characteristic heat capacity of said battery, from this, and from a measured average battery, a calculated temperature of the battery is calculated by means of heat balances, this calculated temperature being used as the battery temperature for controlling the battery current.

3. Method according to claim 2, wherein the calculation of the battery temperature is carried out independently of the battery current until both the average battery temperature and the calculated temperature have fallen below predetermined uncritical values.

4. Method according to claim 1, wherein when the battery temperature reaches a second battery temperature value which lies below the limit value, the driver is informed of imminent reduction of the battery current by means of a visual or audible warning signal.

5. Method according to claim 1, wherein if a battery current which exceeds the limit value is requested at a time at which at least one of the temperature values has not yet assumed an uncritical value, a battery current which exceeds the limit value is permitted if the calculated battery temperature has already again dropped below a second limit value lying below the critical temperature.

6. Method according to claim 5, wherein the battery current is reduced more quickly to the permitted constant battery current when the critical battery temperature is reached again than when the critical temperature is exceeded for the first time.

* * * * *